INVENTOR.
EUGENE A. PELCZARSKI
JAMES A. KARNAVAS
BY C. Clark Dougherty Jr.
ATTORNEY

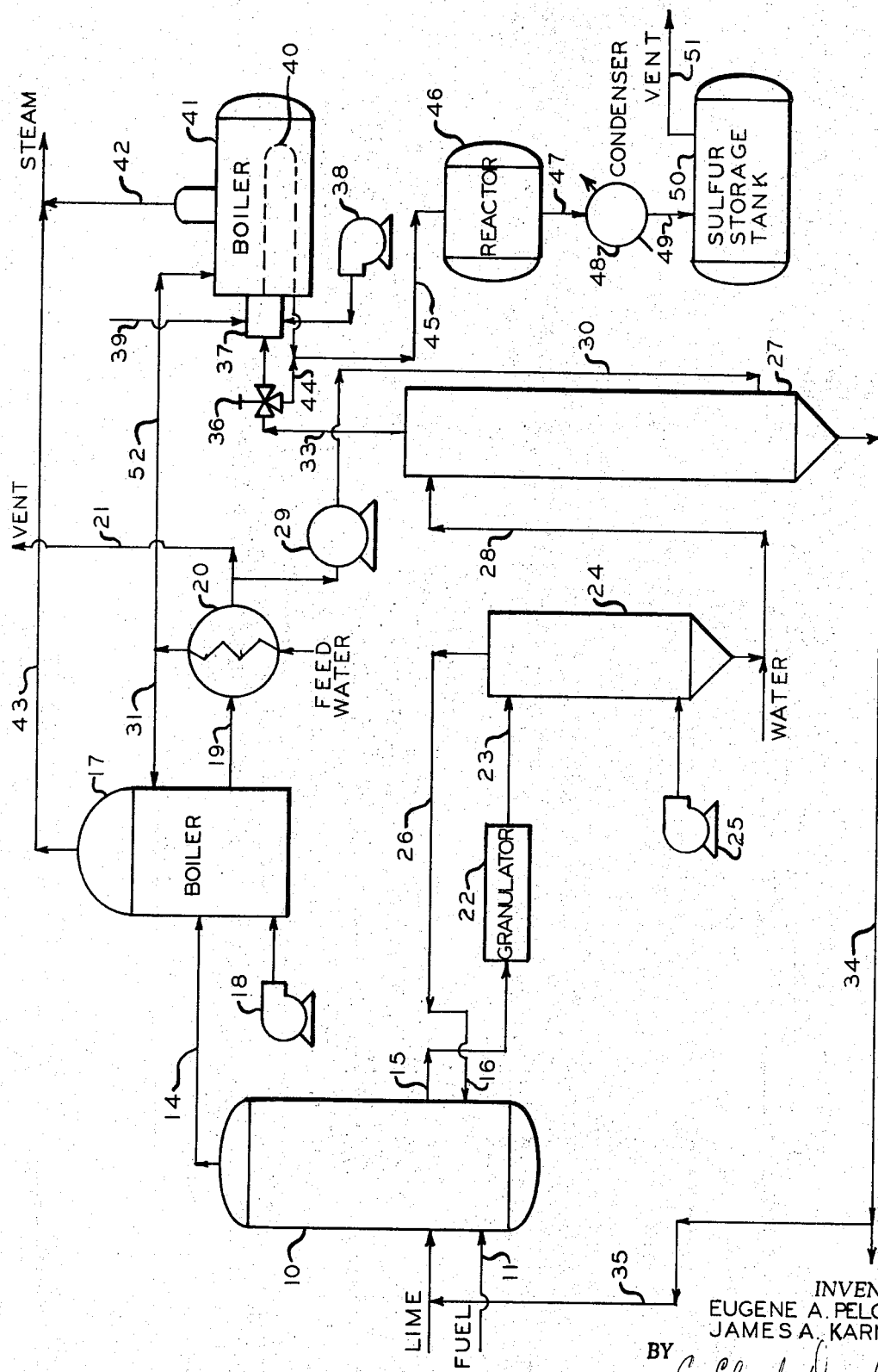

3,533,739
COMBUSTION OF SULFUR-BEARING CARBONACEOUS FUEL
Eugene A. Pelczarski, Independence, and James A. Karnavas, Kansas City, Mo., assignors to Black Sivalls & Bryson, Inc., Kansas City, Mo., a corporation of Delaware
Filed Apr. 1, 1968, Ser. No. 717,851
Int. Cl. C01b *17/02, 31/18*
U.S. Cl. 23—134                9 Claims

ABSTRACT OF THE DISCLOSURE

A process for the combustion of sulfur-bearing fuel whereby sulfur-free gaseous products of combustion including carbon monoxide are obtained which may be used to generate additional heat by further reaction with oxygen to form carbon dioxide or which may be used for a variety of other purposes, and which may then be released to the atmosphere without causing pollution thereof. By the present invention sulfur removed from the fuel during the combustion step may be recovered economically in the form of elemental sulfur.

BACKGROUND OF THE INVENTION

The present invention relates to a process for the combustion and gasification of solid sulfur-bearing carbonaceous fuel. The gasification of solid carbonaceous fuel by reaction with a limited quantity of oxygen to produce carbon monoxide is well known. Either pure oxygen or air may be utilized in the reaction. The products of combustion produced by the reaction include carbon monoxide and may also contain hydrogen, some carbon dioxide, water, and nitrogen. Hydrogen is produced from the hydrocarbons in the fuel while nitrogen may be brought into the action with air, if used, or may also be contained in the fuel. Carbon dioxide may be produced by the reaction of water vapor with carbon monoxide.

Many solid carbonaceous fuels presently commercially available contain sulfur. When these fuels are combusted and gasified by reaction with air or oxygen, sulfur containing gases, usually predominently sulfur dioxide, are produced in addition to the other products of combustion. Such sulfur containing gases in the products of combustion are often objectionable for a variety of reasons, the principal reason being that such sulfur containing gases are highly toxic and are considered to be pollutants when released in the atmosphere.

Prior to the present invention many attempts have been made to remove sulfur from sulfur-bearing fuel prior to combustion of the fuel with air or oxygen. While some of these attempts have been comparatively successful in removing the sulfur, they have proven to be economically unattractive for commercial use because of high investment and operating costs. In addition, processes have been developed to remove the sulfur containing gases after the fuel has been combusted and gasified. However, these processes also generally require expensive equipment or high-operating cost, or both to carry out.

The present invention provides a process for the combustion of sulfur-bearing carbonaceous fuel whereby the sulfur is economically removed during the combustion step so that essentially no sulfur containing gases are produced in the gaseous products of combustion. In addition, the present invention provides a process for converting the sulfur removed from the fuel to calcium sulfide from which pure elemental sulfur may be economically recovered.

SUMMARY OF THE INVENTION

The present invention is directed to a process for the combustion and gasification of solid sulfur-bearing fuel wherein the fuel is injected into a molten iron bath beneath the surface of the bath. A limited quantity of oxygen or air, which may be preheated, is also injected beneath or at the surface of the bath. Carbon contained in the fuel is absorbed by the iron and preferentially reacts with the air or oxygen to form carbon monoxide which then passes upwardly through the iron bath. Sulfur contained in the fuel is also absorbed by the molten iron, but is prevented from reacting with the air or oxygen by the presence of the more chemically active carbon. It should be noted that the carbon content of the molten iron bath must be maintained at a high enough level to insure sulfur dioxide or iron oxide does not form. This may be easily accomplished by controlling the carbonaceous fuel input relative to the air or oxygen input so that the proper level or carbon remains in the iron bath. Also, certain chemicals may be added to the iron bath to increase the activity of the carbon as compared to the activity of sulfur and/or iron.

A molten layer of lime-bearing slag is maintained on the surface of the molten iron bath to serve two purposes—first, it functions as a fluxing agent for the ash, i.e., the mixture of incombustible residue from the fuel and the flux is rendered into a fluid state, and, second, it causes the sulfur absorbed by the molten iron to be desorbed and to react with the lime to form calcium sulfide. Thus, by the present invention, lime is added to the resulting layer of slag on the surface of the molten iron bath and a portion of the slag is continuously withdrawn thereby continuously desorbing and removing sulfur from the iron bath.

The mixture of gases from the combustion reaction including carbon monoxide are collected and may be used for synthesis, shift-conversion to hydrogen, as reagents for other purposes, or may be mixed with additional air or oxygen. If mixed with additional air or oxygen, the carbon monoxide reacts with the oxygen to form carbon dioxide thereby generating additional commercially usable heat. The carbon dioxide and other gases may then be disposed of by releasing them to the atmosphere without fear of pollution.

The slag continuously removed from the surface of the molten iron bath is cooled, granulated, wetted down and contacted with carbon dioxide. The carbon dioxide in the presence of water reacts with calcium sulfide in the slag to form hydrogen sulfide gas and calcium carbonate. The hydrogen sulfide gas is then processed further to recover elemental sulfur.

It is, therefore, an object of the present invention to provide a process for the combustion and gasification of sulfur-bearing carbonaceous fuels.

A further object of the present invention is the provision of a process for the combustion and gasification of solid sulfur-bearing carbonaceous fuels wherein sulfur is removed from the fuel during the combustion step thereby preventing sulfur containing gases from being produced.

It is still a further object of the present invention to provide a process for the combustion of solid sulfur-bearing fuel wherein the products of combustion may be released to the atmosphere without fear of pollution.

Yet a further object of the present invention is the provision of a process for the combustion of solid sulfur-bearing carbonaceous fuels wherein the sulfur removed from the fuel is economically recovered in the form of elemental sulfur.

Other and further objects, features, and advantages will be apparent from the following description of presently preferred embodiments of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein:

FIG. 2 is a diagrammatic view of one form of a system for carrying out the present invention.

DESCRIPTION OF THE PREFERRED EMBODIMENT

Figure 1:
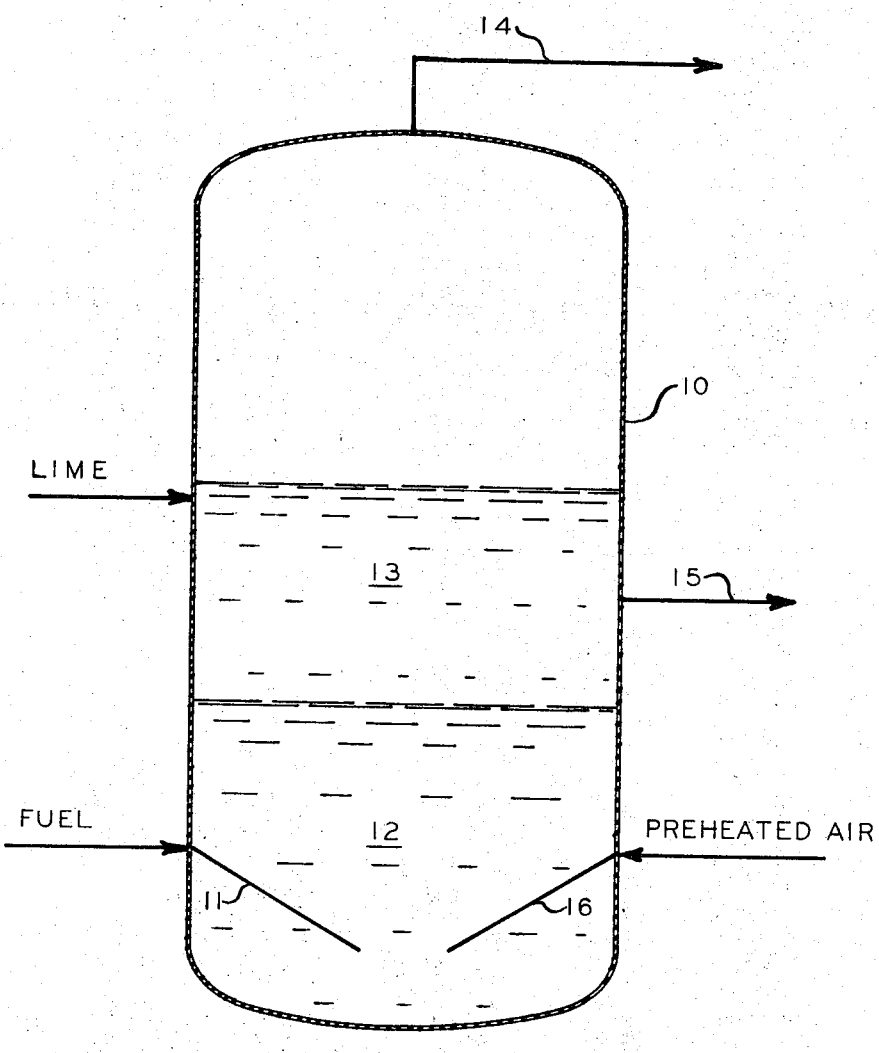
FIG. 1 is a diagrammatic view of a combustion vessel for carrying out the combustion process of the present invention.

Referring now to the drawings, and particularly to FIG. 1, combustion vessel 10 contains a molten iron bath 12. Crusher sulfur-bearing carbonaceous fuel is introduced in the lower portion of iron bath 12 through line 11 which may be a water cooled lance or other similar device. By the present invention it is not necessary to pulverize the fuel into a finely ground powder. However, it is preferable that it not be coarser than ⅛".

Lime is injected into vessel 10 above iron bath 12 so that a molten layer of lime-bearing slag 13 accumulates on the surface of iron bath 12. "Lime" is used here to mean calcium oxide or calcium carbonate (limestone) or dolomite, a mixture of calcium and manganese carbonate or oxide. Calcium carbonate will be converted to calcium oxide at the temperature level within vessel 10.

Preheated air is injected into iron bath 12 through lance 16. Upon contact with the molten iron, carbon from the fuel dissolves in the iron and reacts with oxygen from the air to form carbon monoxide. Sulfur contained in the fuel is absorbed by the iron and is thereby prevented from reacting with the oxygen.

The carbon monoxide thus formed passes upwardly through slag layer 13 and out of vessel 10 through conduit 14. As will be described further herein the carbon monoxide may be further combusted to form carbon dioxide thereby generating additional heat which may be used in a variety of applications.

Ash consisting of incombustibles from the fuel rises to the top of iron bath 12 and is fluxed or rendered into a fluid state by lime to form lime-bearing slag layer 13. Slag layer 13 also functions as a desorbing agent for the sulfur absorbed by the molten iron bath 12. As the sulfur is desorbed from iron bath 12 it reacts with a portion of the lime to form calcium sulfide. Thus, by continuously injecting lime into vessel 10 and continuously removing portions of molten slag layer 13 through a runner or conduit 15 sulfur is continuously desorbed and removed from iron bath 12. The removed slag contains ash, limestone, lime, and calcium sulfide.

Referring now to FIG. 2, carbon monoxide and other gases removed from vessel 10 through conduit 14 may be conducted to the combustion chamber of a boiler 17 where the carbon monoxide is reacted with air to form carbon dioxide. Air is injected into the combustion chamber of boiler 17 by air blower 18. Heat from the reaction of carbon monoxide with oxygen from the air to form carbon dioxide, plus a portion of the sensible heat content of the products of combustion passing through boiler 17, are transferred to water within boiler 17 converting it into steam. The resulting products of combustion pass out of boiler 17 through conduit 19 into heat exchanger 20 where additional sensible heat is used to preheat boiler feed water passing into boiler 17 through conduit 31 and into boiler 41 through conduit 52. From heat exchanger 20 the thus cooled products of combustion pass through conduit 21 from where they may be vented to the atmosphere without fear of the pollution thereof.

The molten slag removed from vessel 10 through runner 15 may be conducted to a granulator 22 which converts it into a granular solid form. Commercial slag granulating devices are available which cool the slag enough to solidify it and at the samt time granulate it. These devices may incorporate a spinning disc, water jet, or other means for cooling and granulating the slag. No further detailed description of granulator 22 is given since a commercially available unit may be used.

Hot granular solid slag is transferred from granulator 22 through conduit 23 to shaft cooler 24. While within shaft cooler 24 the slag is cooled by air passing upwardly which is introduced into shaft cooler 24 by blower 26. Hot air accumulating in shaft cooler 24 is transferred through conduit 26 to lance 16 from where it enters vessel 10 as described above. It should be noted that the slag may be cooled in a variety of ways such as by passing it through a water bath or simply allowing it to lose heat to the atmosphere. Shaft cooler 24 is not necessarily required and pre-heated air may be injected into lance 16 from another source.

The cooled slag from shaft cooler 24 is transferred into desulfurizer 27 through conduit 28. Prior to entering desulfurizer 27 the slag, if not sufficiently wet, is wetted with water which may be sprayed into conduit 28. As the wetted slag passed downwardly through desulfurizer 27 it is contacted by carbon dioxide passing upwardly. A portion of the products of combustion may be used as the source of carbon dioxide for desulfurizer 27. For this purpose pump 29 is used to transfer a portion of the products of combustion into conduit 30 which is connected to desulfurizer 27.

In the presence of water, carbon dioxide in the products of combustion reacts with the calcium sulfide in the slag to form calcium carbonate and hydrogen sulfide. The carbon dioxide will also simultaneously react with lime in the slag to form additional calcium carbonate.

The hydrogen sulfide thus formed along with some unreacted carbon dioxide pass upwardly within desulfurizer 27 and into conduit 33. The reacted or spent slag accumulating in the bottom portion of desulfurizer 27 contains unreacted calcium oxide, calcium carbonate, ash, and some calcium sulfide and is transferred into conduit 34. A portion of the slag may be recycled to combustion vessel 10 through conduit 35, but in order to prevent excessive ash build up a portion must be removed through conduit 34 and disposed of.

The hydrogen sulfide and unreacted carbon dioxide pass through conduit 33 to three-way valve 36 which is adjusted so that approximately one-third of the gases pass to burner 37 and two-thirds pass into conduit 44. Burner 37 is supplied with air by pump 38 and the hydrogen sulfide is combusted to form sulfur dioxide and water vapor. In order to insure combustion within burner 37 it may be necessary to add natural gas through conduit 39. The sulfur dioxide and water vapor along with other products of combustion and carbon dioxide pass through conduit 40 which is disposed within boiler 41. Heat given off by the combustion reaction is transferred through the walls of conduit 40 and into water contained within boiler 41 thereby generating steam. The thus generated steam is passed out of boiler 41 through conduit 42 and combined with steam generated in boiler 17 passing through conduit 43. The combined steam may be used to provide heat for another process, power turbines in a power plant or utilized for a variety of other purposes as will be apparent to those skilled in the art.

After passing through conduit 40, the sulfur dioxide, carbon dioxide, water vapor, and other gases generated in burner 37 are combined with hydrogen sulfide and carbon dioxide stream in conduit 44. The combined stream is then passed through conduit 45 into reactor 46. Reactor 46 contains a catalyst, preferably bauxite, which has the effect of accelerating a reaction between the sulfur dioxide and hydrogen sulfide to form elemental sulfur vapor and water vapor. This reaction is well known in the art and may be controlled to produce a high yield of elemental sulfur. For this reason no further detailed description of the reaction is given.

The thus formed elemental sulfur is passed out of reactor 46 through conduit 47 into condenser 48. Condenser 48 may utilize water or air as the cooling media and cools the gases passing through it enough to condense the sulfur vapor. The condensed sulfur along with carbon dioxide, water and other vapors pass through conduit 49 into sulfur storage tank 50 where the sulfur accumulates. The remaining carbon dioxide, water, and other vapors pass out of storage tank 50 through conduit 51 from where they may be vented to the atmosphere.

While a steam boiler system is described herein for purposes of disclosure, it will be apparent to those skilled in the art that the heat generated from the combustion of fuel by the present invention may be utilized in any application where hot products of combustion are utilized as reagents or as a heat and energy source, and where carbonaceous fuel is available. The present invention therefore is well adapted to carry out the objects and attain the ends and advantages mentioned as well as those inherent therein. While presently preferred embodiments of the invention are given for the purpose of disclosure, numerous changes in the details of the process and arrangement of steps can be made which will readily suggest themselves to those skilled in the art and which are encompassed within the spirit of the invention and the scope of the appended claims.

What is claimed is:

1. A process for the combustion of solid sulfur-bearing carbonaceous fuel wherein sulfur-free combustion gases are produced, comprising the steps of:
   reacting said fuel with a controlled quantity of oxygen beneath the surface of a molten iron bath so that carbon monoxide and other sulfur-free gases are formed and sulfur from sai dfuel is absorbed by said iron bath;
   introducing lime on the surface of said molten iron bath so that sulfur is desorbed from said iron bath and reacts with said lime to form calcium sulfide;
   removing said carbon monoxide and other sulfur-free gases from said iron bath; and
   removing said calcium sulfide from said iron bath.

2. The process as set forth in claim 1 which is further characterized to include the step of recovering elemental sulfur from said removed calcium sulfide.

3. The process as set forth in claim 2, which is further characterized to include the step of reacting said removed carbon monoxide and other sulfur-free gases with additional oxygen to form carbon dioxide thereby generating heat.

4. A process for the combustion of solid sulfur-bearing carbonaceous fuel containing ash wherein sulfur-free combustion gases are produced comprising the steps of:
   introducing said fuel into a combustion vessel beneath the surface of a molten iron bath contained therein so that carbon and sulfur in said fuel are absorbed by said iron bath;
   reacting said absorbed carbon with a controlled quantity of oxygen to form carbon monoxide and other sulfur-free gases;
   introducing lime on the surface of said iron bath so that sulfur is desorbed from the iron bath and reacted with said lime to form calcium sulfide and so that a molten layer of slag is formed from ash and lime on the surface of said molten iron bath;
   removing said carbon monoxide and other gases from said combustion vessel; and
   removing portions of said layer of slag and calcium sulfide from the surface of said molten iron bath and from said combustion vessel.

5. The process of claim 4 which is further characterized to include the step of recovering elemental sulfur from said removed portions of slag and calcium sulfide to form spent slag.

6. The process of claim 5 which is further characterized to include the step of recycling a portion of said spent slag to the surface of said molten iron bath.

7. The process of claim 6 which is further characterized to include the step of reacting said removed carbon monoxide and other sulfur-free gases with additional oxygen to form carbon dioxide thereby generating heat.

8. A process for the combustion of solid sulfur-bearing carbonaceous fuel containing ash wherein sulfur-free gases are produced which comprises the steps of:
   introducing said fuel into a combustion vessel beneath the surface of a molten iron bath contained therein so that carbon and sulfur in said fuel are absorbed by said iron bath;
   reacting said absorbed carbon with a controlled quantity of oxygen in said combustion vessel to form carbon monoxide and other sulfur-free gases;
   introducing lime on the surface of said iron bath so that sulfur is desorbed from the iron bath and reacted with said lime to form calcium sulfide and so that a molten layer of slag is formed from ash and lime on the surface of said molten iron bath;
   removing said carbon monoxide and other sulfur-free gases from said combustion vessel;
   removing portions of said layer of slag and calcium sulfide from the surface of said molten iron bath;
   contacting said removed portions of slag and calcium sulfide with carbon dioxide in the presence of water to form hydrogen sulfide vapor and spent slag;
   combusting said hydrogen sulfide vapor to convert a portion of it to sulfide dioxide;
   reacting said portion of sulfur dioxide with the remaining hydrogen sulfide to form elemental sulfur vapor;
   condensing said elemental sulfur vapor; and
   recycling a portion of said spent slag to the surface of said molten iron bath.

9. The process of claim 8 which is further characterized to include the step of reacting said removed carbon monoxide and other sulfur-free gases with additional oxygen to form carbon dioxide thereby generating heat.

References Cited

UNITED STATES PATENTS

| | | | |
|---|---|---|---|
| 1,592,860 | 7/1926 | Leonarz | 48—92 |
| 2,691,573 | 10/1954 | Mayland | 23—134 X |
| 2,824,047 | 2/1958 | Gorin et al. | 201—17 |
| 2,830,883 | 4/1958 | Eastman | 23—204 X |
| 2,953,445 | 8/1960 | Ruummel | 42—98 X |
| 3,249,402 | 5/1966 | Smyers et al. | 23—181 X |
| 3,402,998 | 8/1968 | Squires | 23—181 |

OSCAR R. VERTIZ, Primary Examiner

G. O. PETERS, Assistant Examiner

U.S. Cl. X.R.

23—204, 229; 48—92